United States Patent
Yamada et al.

(10) Patent No.: US 11,148,218 B2
(45) Date of Patent: Oct. 19, 2021

(54) METHOD FOR WELDING STEEL PIPE IN STEEL PIPE STRUCTURE AND JOINT

(71) Applicant: HITACHI ZOSEN CORPORATION, Osaka (JP)

(72) Inventors: Junya Yamada, Osaka (JP); Mitsuyoshi Nakatani, Osaka (JP); Kazuhiko Tani, Osaka (JP); Tatsuya Nariyama, Osaka (JP); Hisato Yuto, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 446 days.

(21) Appl. No.: 16/083,398

(22) PCT Filed: Dec. 26, 2016

(86) PCT No.: PCT/JP2016/088674
§ 371 (c)(1),
(2) Date: Sep. 7, 2018

(87) PCT Pub. No.: WO2017/154311
PCT Pub. Date: Sep. 14, 2017

(65) Prior Publication Data
US 2019/0099821 A1    Apr. 4, 2019

(30) Foreign Application Priority Data

Mar. 10, 2016  (JP) .............................. JP2016-046389

(51) Int. Cl.
*B23K 9/028*     (2006.01)
*B23K 37/053*   (2006.01)
(Continued)

(52) U.S. Cl.
CPC ............ *B23K 9/0282* (2013.01); *B23K 31/02* (2013.01); *B23K 31/027* (2013.01); *B23K 31/12* (2013.01);
(Continued)

(58) Field of Classification Search
CPC .... B23K 9/0282; B23K 31/027; B23K 31/02; B23K 37/053; B23K 2103/04; B23K 2101/10; G01B 21/20; G01B 21/00
(Continued)

(56) References Cited

U.S. PATENT DOCUMENTS 4,223,197 A * 9/1980 Imai .................... B23K 9/0282
219/61.7
4,257,155 A * 3/1981 Hunter .................. B21D 39/04
285/382.2
(Continued)

FOREIGN PATENT DOCUMENTS

CN        2763668 Y    3/2006
CN      101788139 A    7/2010
(Continued)

OTHER PUBLICATIONS

International Search Report PCT/JP2016/088674 dated Feb. 14, 2017 with English language translation.
(Continued)

*Primary Examiner* — Jimmy Chou
(74) *Attorney, Agent, or Firm* — Pillsbury Winthrop Shaw Pittman, LLP

(57) ABSTRACT

A method for welding a steel pipe in a steel pipe structure and a joint is provided. The welding method includes: a measurement step of measuring a manufacturing error of the steel pipe, a calculation step of calculating the positions of the steel pipe and the joint where the manufacturing error measured in the measurement step is absorbed, and a weld-
(Continued)

ing step of welding the steel pipe and the joint at the positions of the steel pipe and the joint, the positions being calculated in the calculation step.

5 Claims, 8 Drawing Sheets

(51) Int. Cl.
*B23K 31/12* (2006.01)
*B23K 31/02* (2006.01)
*G01B 21/20* (2006.01)
*G01B 21/00* (2006.01)
*B23K 103/04* (2006.01)
*B23K 101/06* (2006.01)
*B23K 101/10* (2006.01)

(52) U.S. Cl.
CPC ............ *B23K 37/053* (2013.01); *G01B 21/20* (2013.01); *B23K 2101/06* (2018.08); *B23K 2101/10* (2018.08); *B23K 2103/04* (2018.08); *G01B 21/00* (2013.01)

(58) Field of Classification Search
USPC ............................................ 702/151; 219/59
See application file for complete search history.

(56) References Cited

U.S. PATENT DOCUMENTS

| | | | | |
|---|---|---|---|---|
| 5,820,720 A * | 10/1998 | Campbell | ............ | B29C 65/3476 156/273.9 |
| 5,895,535 A * | 4/1999 | Bentz | ................ | B65H 23/0204 156/64 |
| 6,253,989 B1 * | 7/2001 | Bennett | ................... | B23K 9/04 228/134 |
| 6,273,320 B1 * | 8/2001 | Siebert | ................... | B23K 31/02 228/102 |
| 6,637,642 B1 * | 10/2003 | Lingnau | ................. | B23K 13/00 228/112.1 |
| 7,282,663 B2 * | 10/2007 | Alford | ..................... | B23K 1/00 219/101 |
| 7,385,156 B2 * | 6/2008 | Nozue | ..................... | B23K 11/02 219/107 |
| 7,617,605 B2 * | 11/2009 | Fochtman | .......... | B23K 26/0823 123/470 |
| 7,774,917 B2 * | 8/2010 | Anderson | ............ | B23K 20/023 29/505 |
| 7,815,093 B2 * | 10/2010 | Hees | .................... | B23K 9/0286 228/44.5 |
| 7,930,825 B2 * | 4/2011 | Fochtman | ............ | B23K 26/244 29/890.131 |
| 8,061,582 B2 * | 11/2011 | Cittadini Bellini | ......................... | B23K 37/0533 228/176 |
| 8,229,681 B2 * | 7/2012 | Minnaar | .................. | G01N 3/20 702/33 |
| 8,607,457 B2 * | 12/2013 | Huemmer | ................ | F16K 27/10 29/890.129 |
| 2003/0016777 A1 * | 1/2003 | Vandergheynst | ........ | G21C 3/10 376/451 |
| 2004/0238496 A1 * | 12/2004 | Kimura | ................ | B23K 9/1274 219/60 A |
| 2005/0236372 A1 * | 10/2005 | Moe | ..................... | B23K 33/006 219/101 |
| 2006/0201915 A1 * | 9/2006 | Obana | .................. | B23K 9/0213 219/76.1 |
| 2006/0212261 A1 * | 9/2006 | Glascock | ............... | G01B 17/00 702/155 |
| 2007/0119829 A1 * | 5/2007 | Vietz | .................... | B23K 26/348 219/121.63 |
| 2009/0132181 A1 * | 5/2009 | Girndt | .................. | G01N 29/265 702/39 |
| 2009/0169912 A1 * | 7/2009 | Hoyt | .................... | B23K 9/0286 428/586 |
| 2009/0212024 A1 * | 8/2009 | Muller | ............... | B23K 37/0531 219/61 |
| 2009/0280349 A1 * | 11/2009 | Bittendorfer | ........ | B23K 26/242 428/594 |
| 2009/0294426 A1 * | 12/2009 | Bong | ..................... | B23K 9/188 219/136 |
| 2010/0241394 A1 * | 9/2010 | Ihara | ...................... | G01B 21/24 702/151 |
| 2011/0192824 A1 * | 8/2011 | Vestergaard | ......... | B23K 26/244 219/121.64 |
| 2012/0027506 A1 * | 2/2012 | Yahaba | .................. | B62D 21/11 403/270 |
| 2012/0174372 A1 * | 7/2012 | Dagenais | ........... | B23K 37/0533 29/428 |
| 2012/0213937 A1 * | 8/2012 | LaValley | .................. | B26D 3/16 427/401 |
| 2013/0092665 A1 * | 4/2013 | Hassel | ............... | B23K 37/0531 219/121.11 |
| 2013/0305550 A1 * | 11/2013 | Nohmi | ..................... | G01B 5/00 33/534 |
| 2014/0332514 A1 * | 11/2014 | Holverson | ........... | B23K 9/0956 219/130.01 |
| 2015/0019142 A1 * | 1/2015 | Komai | ................... | G01N 17/00 702/34 |
| 2015/0094979 A1 * | 4/2015 | Tanaka | ................. | B23K 31/027 702/151 |
| 2015/0196968 A1 * | 7/2015 | Lehr | ..................... | B23K 9/0282 219/61.3 |
| 2016/0121422 A1 * | 5/2016 | Si | ............................ | B23K 9/167 219/74 |
| 2018/0001422 A1 * | 1/2018 | Rajagopalan | ......... | B23K 9/0286 |
| 2018/0031152 A1 * | 2/2018 | Rajagopalan | ......... | B23K 31/125 |
| 2018/0117718 A1 * | 5/2018 | Rajagopalan | ...... | B23K 37/0531 |
| 2019/0308277 A1 * | 10/2019 | Reiz | ........................ | H04N 7/185 |
| 2020/0292102 A1 * | 9/2020 | Ducceschi | ......... | B23K 37/0217 |

FOREIGN PATENT DOCUMENTS

| | | |
|---|---|---|
| CN | 201992211 U | 9/2011 |
| CN | 103821378 A | 5/2014 |
| CN | 104125873 A | 10/2014 |
| CN | 204928010 U | 12/2015 |
| CN | 105246608 A | 1/2016 |
| EP | 3006128 A1 | 4/2016 |
| JP | 46-35481 A | 12/1971 |
| JP | 07-279920 A | 10/1995 |
| JP | 2010-017731 A | 1/2010 |
| JP | 2010-065388 A | 3/2010 |
| JP | 2011-117274 A | 6/2011 |
| WO | 2013/132561 A1 | 9/2013 |

OTHER PUBLICATIONS

Office Action issued in corresponding Chinese Patent Application No. 201680083327.7 dated Sep. 3, 2019.

* cited by examiner

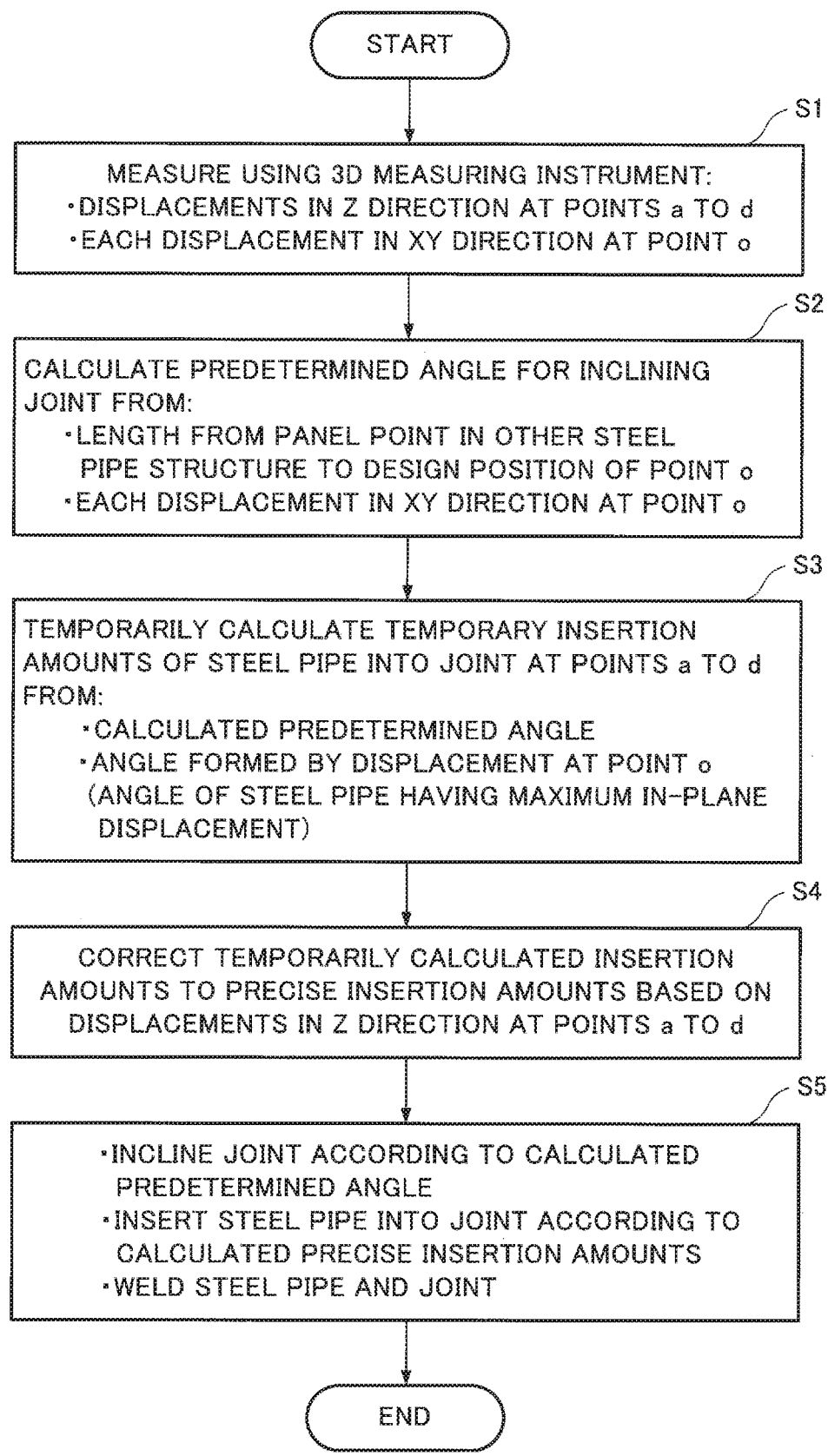

METHOD FOR WELDING STEEL PIPE IN STEEL PIPE STRUCTURE AND JOINT

CROSS-REFERENCE TO RELATED APPLICATIONS

This is the U.S. National Stage of PCT/JP2016/088674, filed Dec. 26, 2016, which in turn claims priority to Japanese Patent Application No. 2016-046389, filed Mar. 10, 2016, the contents of each of these applications being incorporated herein by reference in their entireties.

TECHNICAL FIELD

The present invention relates to a method for welding a steel pipe in a steel pipe structure and a joint.

BACKGROUND ART

Steel pipes can be joined via joints so as to extend longer than a single steel pipe. Typically, steel pipes are linearly joined via joints. At some installation sites of the steel pipes, however, slightly bent steel pipes may need to be joined instead of linearly joined steel pipes, and thus joints for this purpose are also proposed (for example, see Patent Literature 1). A joint described in Patent Literature 1 is configured such that a pipe end attached at a certain angle of inclination to the outer periphery of an end of a steel pipe (pipe) can be received while being inclined at the angle.

CITATION LIST

Patent Literature

Patent Literature 1: Japanese Utility Model Publication No. 46-35481

SUMMARY OF INVENTION

Technical Problem

The joint described in Patent Literature 1 attempts a configuration such that the inclination of the steel pipe and the joint is adjusted with bolts and nuts to an angle up to twice as large as the angle at the installation site of the steel pipe. This adjustment is made to absorb the manufacturing error and the installation error of the steel pipe. Thus, the joint absorbs the manufacturing error and the like using the bolts and nuts instead of welding in a proper positional relationship with the steel pipe. For this reason, in the welding of the steel pipe and the joint, the steel pipe and the joint are uniformly inclined at the angle regardless of the manufacturing error. Hence, if the steel pipe has a large manufacturing error or the like, the steel pipe and the joint are disadvantageously welded in an improper positional relationship.

An object of the present invention is to provide a method for welding a steel pipe in a steel pipe structure and a joint so as to enable the steel pipe and the joint to be welded in a proper positional relationship.

Solution to Problem

In order to solve the problem, a method for welding a steel pipe in a steel pipe structure and a joint according to a first invention is a method for welding a steel pipe in a steel pipe structure and a joint, the method including:

a measurement step of measuring the manufacturing error of the steel pipe in the steel pipe structure;

a calculation step of calculating the positions of the steel pipe and the joint where the manufacturing error measured in the measurement step is absorbed; and a welding step of welding the steel pipe and the joint at the positions of the steel pipe and the joint, the positions being calculated in the calculation step.

In a method for welding a steel pipe in a steel pipe structure and a joint according to a second invention, in the method for welding the steel pipe in the steel pipe structure and the joint according to the first invention, the calculated positions of the steel pipe and the joint in the calculation step are a predetermined angle for inclining the joint from a design position and the insertion amount of the steel pipe into the joint inclined at the predetermined angle.

In a method for welding a steel pipe in a steel pipe structure and a joint according to a third invention, in the method for welding the steel pipe in the steel pipe structure and the joint according to the second invention, the predetermined angle is calculated based on a manufacturing error in a direction perpendicular to the axis of the steel pipe at the design position.

In a method for welding a steel pipe in a steel pipe structure and a joint according to a fourth invention, in the method for welding the steel pipe in the steel pipe structure and the joint according to the second or third invention, the insertion amount of the steel pipe into the joint inclined at the predetermined angle is calculated based on the predetermined angle, a manufacturing error in a direction perpendicular to an axis of the steel pipe at the design position, and a manufacturing error in a direction parallel to the axis of the steel pipe at the design position.

Advantageous Effect of Invention

According to the method for welding the steel pipe in the steel pipe structure and the joint, the positions of the steel pipe and the joint where the manufacturing error is absorbed are calculated before welding, and then the steel pipe and the joint are welded at the positions, thereby welding the steel pipe and the joint in a proper positional relationship.

BRIEF DESCRIPTION OF DRAWINGS

FIG. 9 is a flowchart showing the welding method.

DESCRIPTION OF EMBODIMENT

Figure 1:
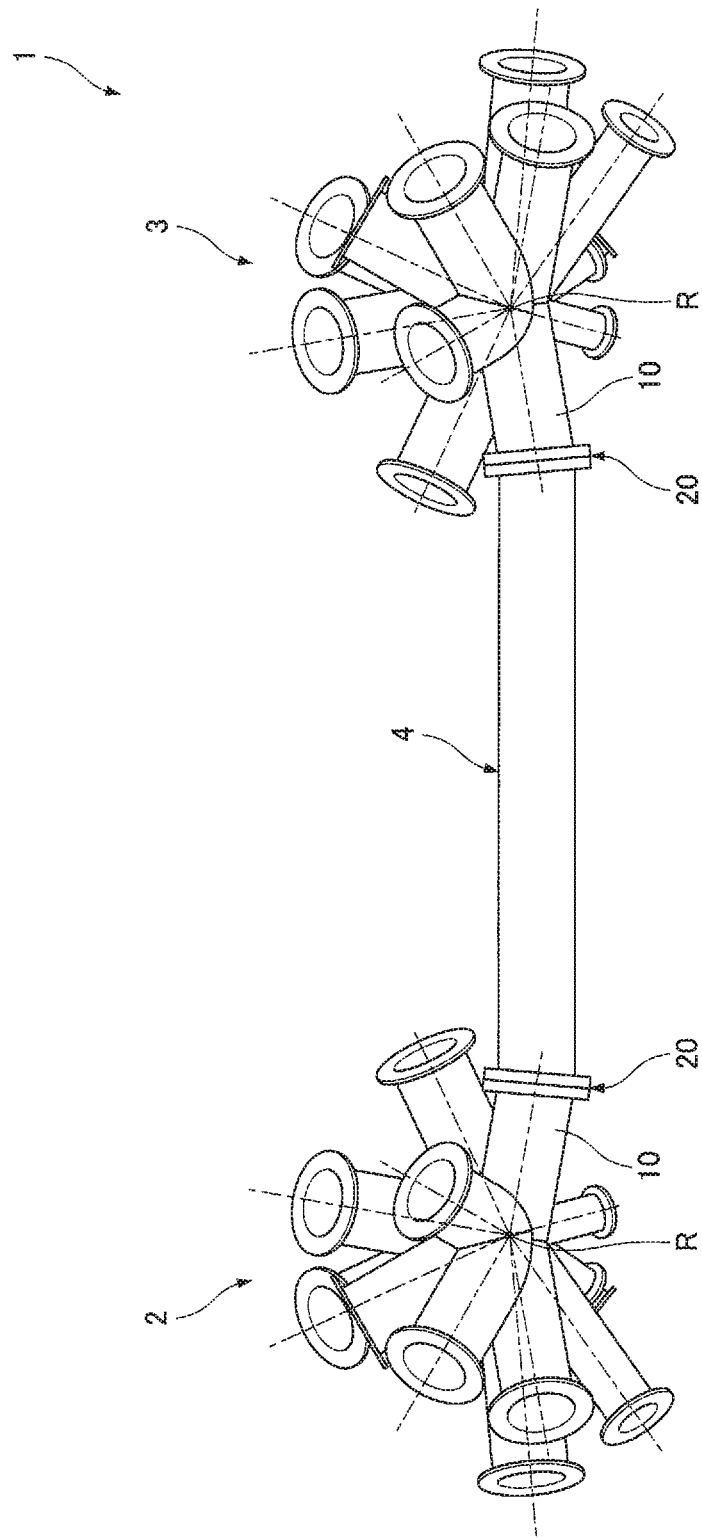
FIG. 1 is a side view showing a connecting steel pipe structure including steel pipe structures according to an embodiment of the present invention.

A method for welding a steel pipe in a steel pipe structure and a joint according to an embodiment of the present invention will be described below. As shown in FIG. 1, steel pipes in a steel pipe structure and joints are welded to manufacture a connecting steel pipe structure 1 including a plurality of (two in the example of FIG. 1) steel pipe structures 2 and 3 connected via a steel pipe 4 (hereinafter will be referred to as a connecting steel pipe 4) that is different from the steel pipe structures 2 and 3.

First, the connecting steel pipe structure 1 will be schematically described with reference to the drawing.

As shown in FIG. 1, the connecting steel pipe structure 1 includes the plurality of (two in the example of FIG. 1) the steel pipe structures 2 and 3, the connecting steel pipe 4 connecting the steel pipe structures 2 and 3, and joints 20 joining the connecting steel pipe 4 and steel pipes 10 in the steel pipe structures 2 and 3.

The steel pipe structures 2 and 3 each include multiple short steel pipes 10 radially welded with all the axes directed to a point (hereinafter will be referred to as a panel point R). Thus, in the steel pipe structures 2 and 3, the multiple short steel pipes 10 constituting the steel pipe structures have extremely complicated weld lines. This inevitably causes manufacturing errors in the steel pipe structures 2 and 3 and the steel pipes 10 constituting the steel pipe structures.

Figure 2:
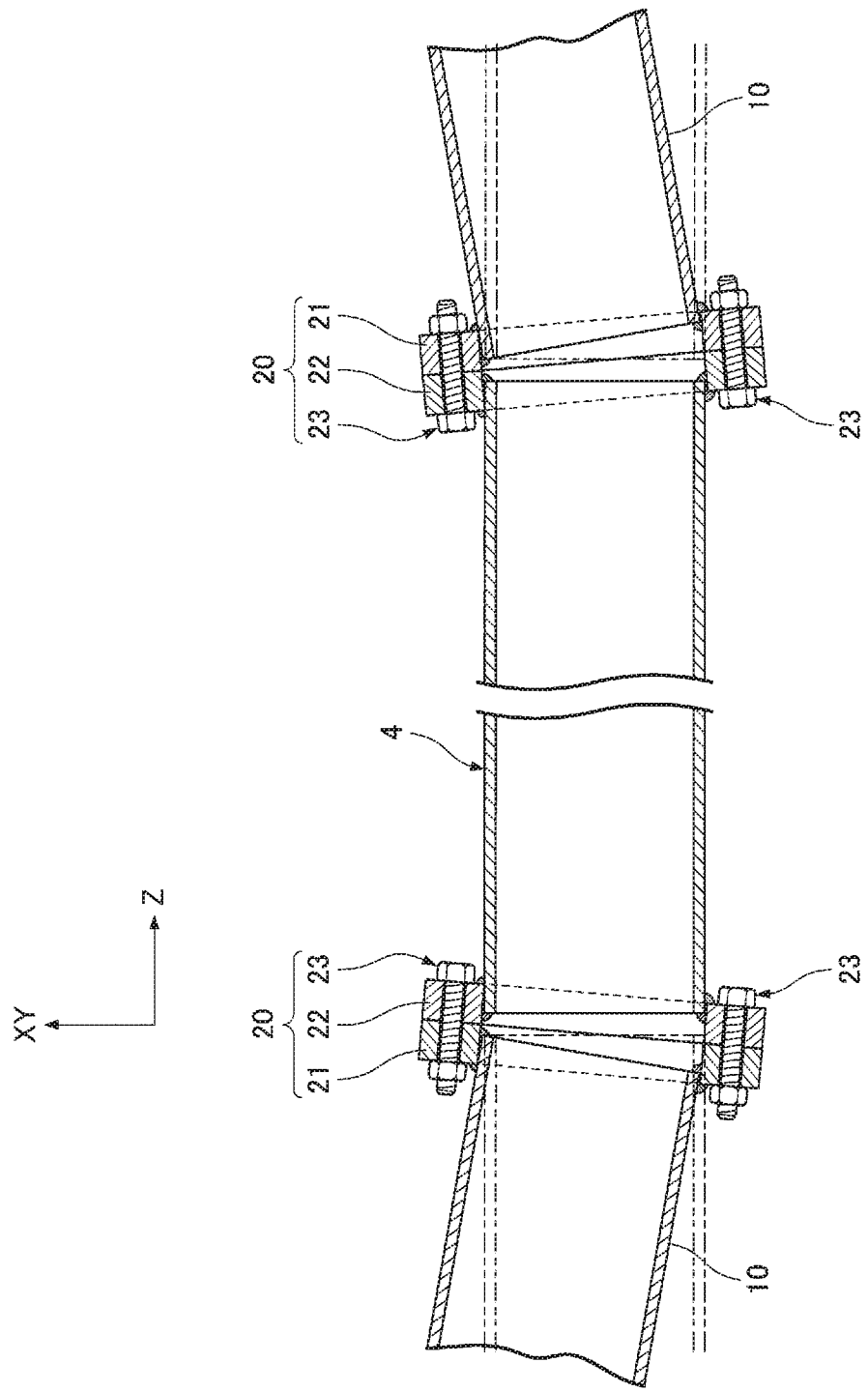
FIG. 2 is a cross-sectional view showing joining of steel pipes in the steel pipe structures of the connecting steel pipe structure and a connecting steel pipe via joints.

As shown in FIG. 2, the joint 20 is, for example, a slip-on flange. The steel pipe 10 in the steel pipe structure 2 or 3 is inserted and welded from one side of the joint 20 while the connecting steel pipe 4 is inserted and welded from the other side of the joint 20, joining the steel pipe 10 on one side and the connecting steel pipe 4 on the other side. Thus, the joint 20 has a larger inside diameter than the outside diameters of the steel pipe 10 and the connecting steel pipe 4. The inside diameter is set such that the steel pipe 10 and the connecting steel pipe 4 can be inclined and inserted so as to absorb the manufacturing error. The joint 20 includes a first flange 21 to which the steel pipe 10 in the steel pipe structure 2 or 3 is inserted and welded, a second flange 22 to which the connecting steel pipe 4 is inserted and welded, and bolts and nuts 23 that join the first flange 21 and the second flange 22 at the circumferential positions of the joint 20.

A method for manufacturing the connecting steel pipe structure 1 will be described below.

First, in a factory, the steel pipe 10 in the steel pipe structure 2 or 3 is inserted into the joint 20, and then the steel pipe 10 and the joint 20 (specifically, the first flange 21) are welded to each other. After the two steel pipe structures 2 and 3 are prepared with the joints 20 welded to the steel pipes 10, for example, the steel pipe structures 2 and 3 are installed at precise positions. During the installation, one end of the connecting steel pipe 4 is inserted into the joint 20 welded to the steel pipe 10 in the steel pipe structure 3 and the other end of the connecting steel pipe 4 is inserted into the joint 20 welded to the steel pipe 10 in the other steel pipe structure 2. Then, the joints 20 (specifically, the second flanges 22) and both ends of the connecting steel pipe 4 are welded to manufacture the connecting steel pipe structure 1. Subsequently, the bolts and nuts 23 are removed from the joints 20 of the connecting steel pipe structure 1. This can disassemble the connecting steel pipe structure 1 into three kinds of parts, facilitating the transportation of the connecting steel pipe structure 1. The three kinds of parts are the (two) steel pipe structures 2 and 3 where the first flanges 21 are welded to the steel pipes 10, the connecting steel pipe 4 where the second flanges 22 are welded to both ends of the connecting steel pipe 4, and the bolts and nuts 23 that join the first flanges 21 and the second flanges 22. The tree kinds of parts are conveyed to the installation site of the connecting steel pipe structure 1. At the installation site, the parts of the two steel pipe structures 2 and 3 are installed at precise positions, the parts of the connecting steel pipe 4 are disposed between the parts of the steel pipe structures 2 and 3, and the first flanges 21 and the second flanges 22 are joined with the bolts and nuts 23. Thus, the connecting steel pipe structure 1 can be assembled at the installation site with substantially the same precision as in the factory.

A method for welding the steel pipe 10 in the steel pipe structure 3 and the joint 20, that is, a method for welding the steel pipe 10 and the joint 20 in the method for manufacturing the connecting steel pipe structure 1 will be described below.

Figure 3:
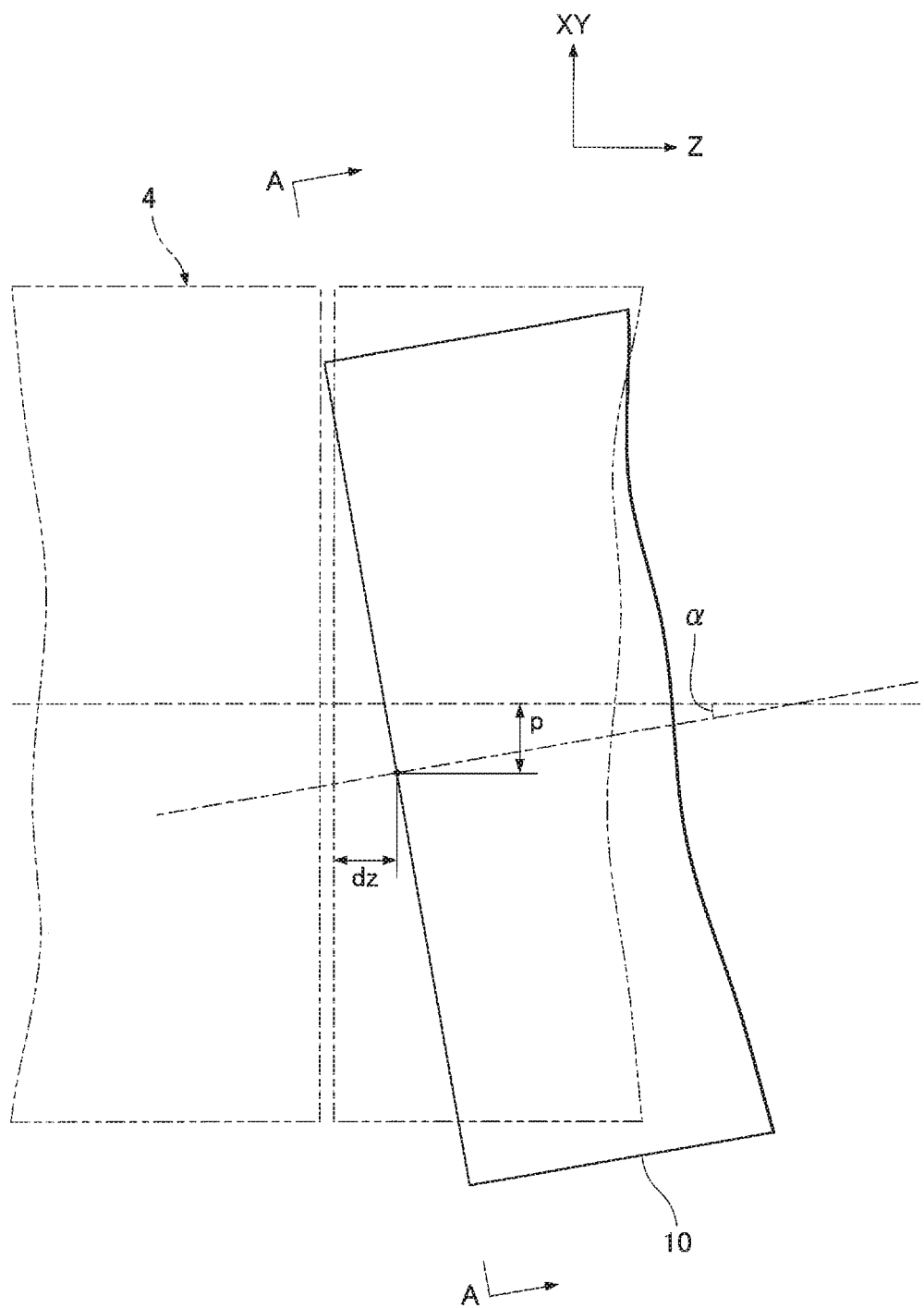
FIG. 3 is a schematic diagram showing a displacement caused by the manufacturing error of the steel pipe.
Figure 4:
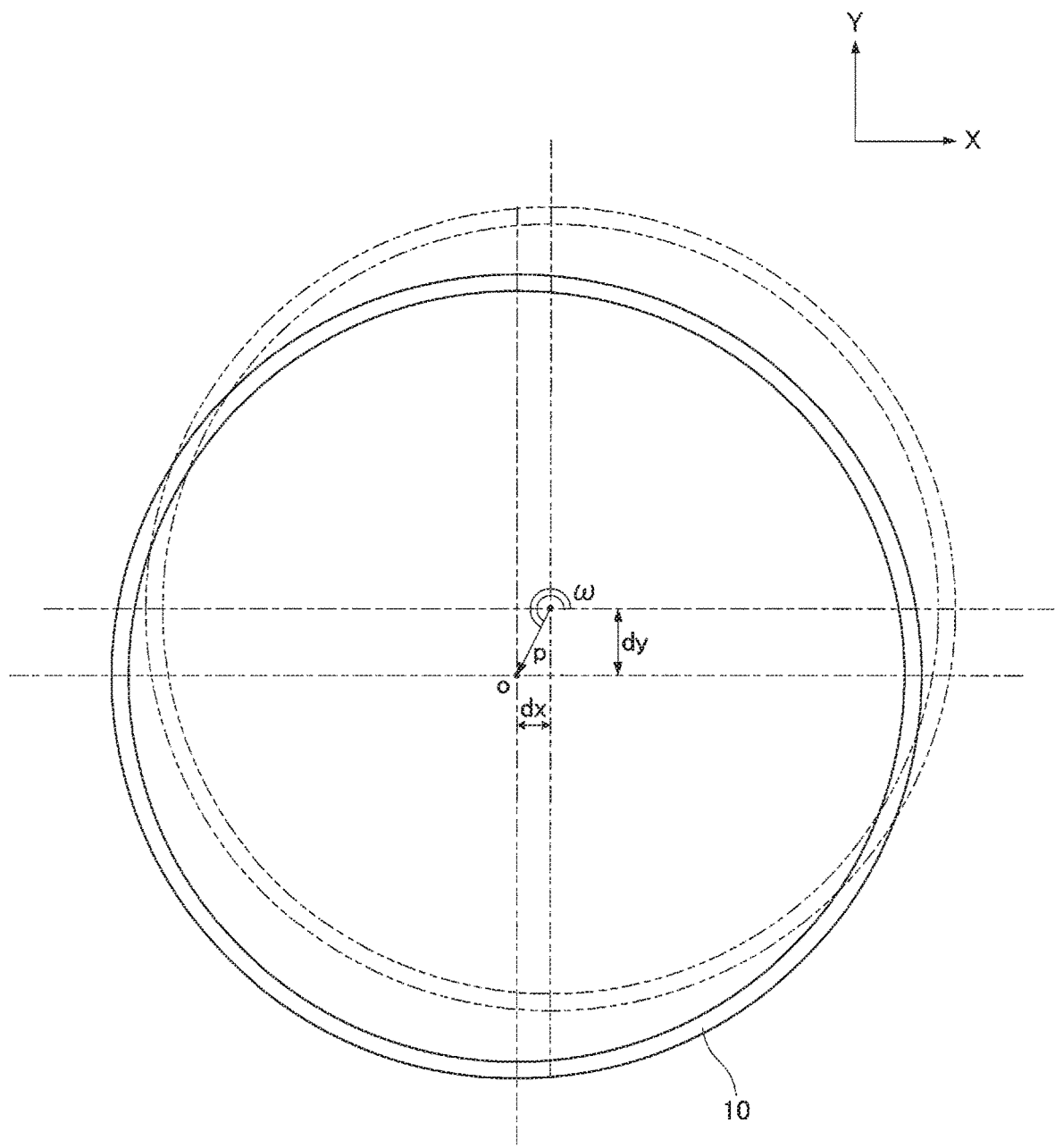
FIG. 4 a cross-sectional view taken along line A-A of FIG. 3.
Figure 5:
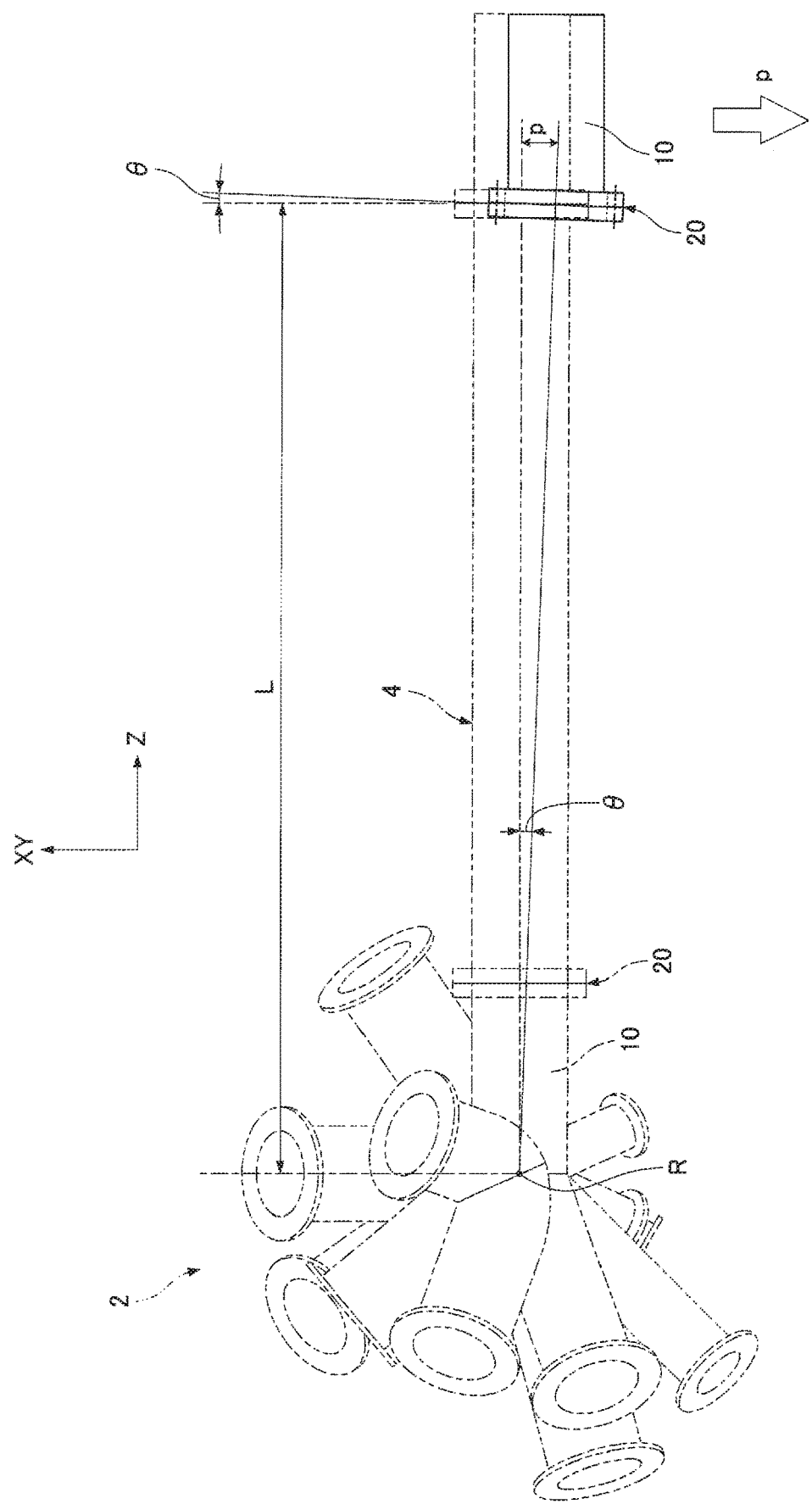
FIG. 5 is a side view showing that only a component in an XY direction is extracted from the displacement.
Figure 6:
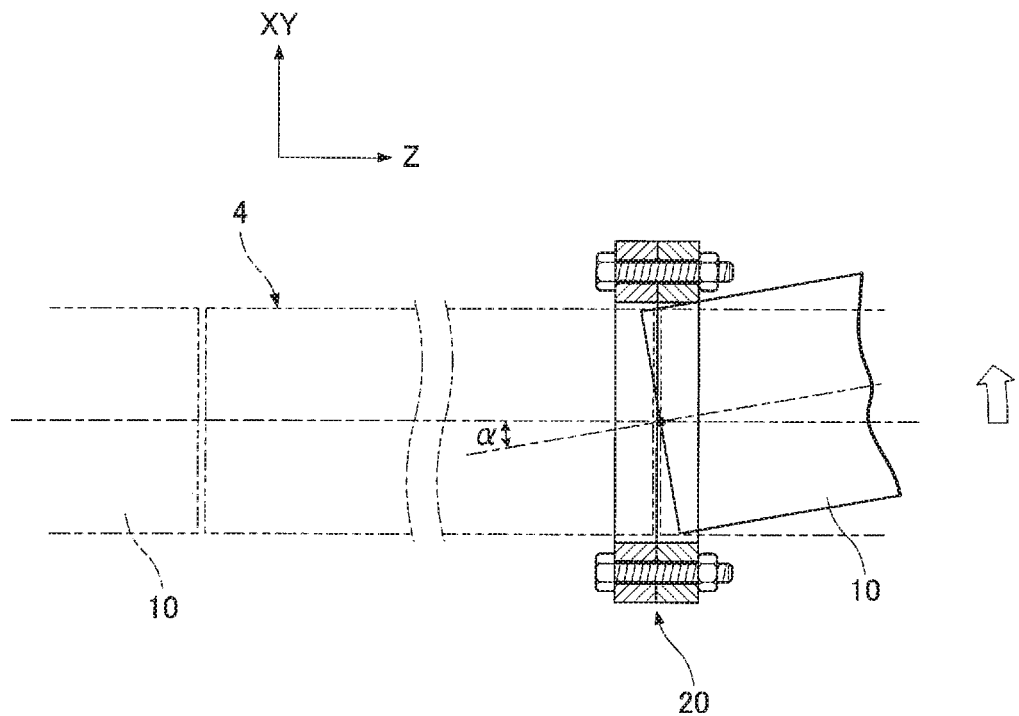
FIG. 6 is a side view showing that only a component of inclination is extracted from the displacement.
Figure 7:
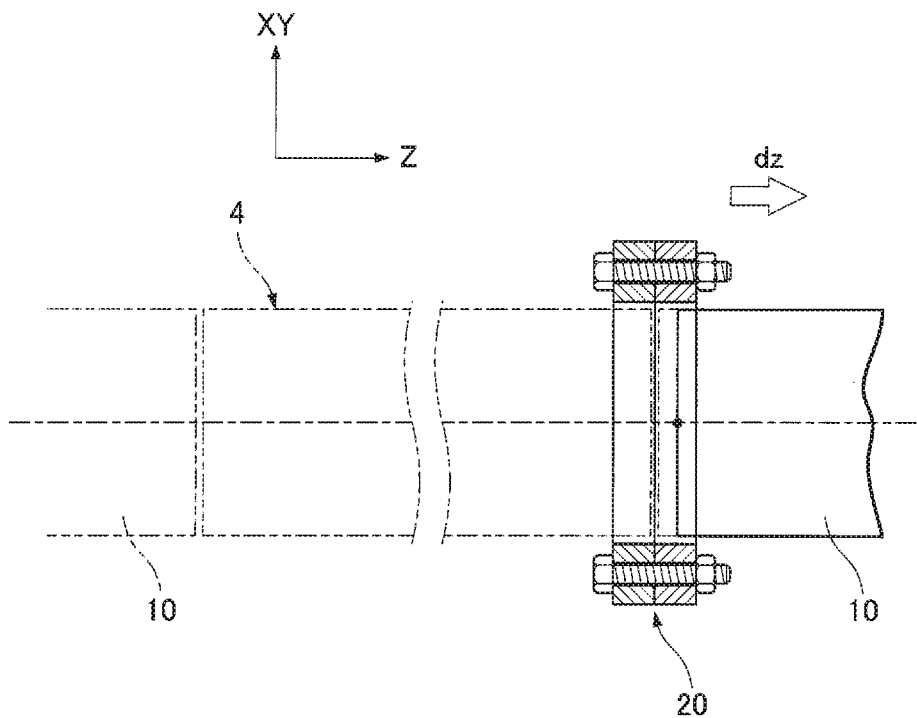
FIG. 7 is a side view showing that only a component in a Z direction is extracted from the displacement.

As has been discussed, the steel pipe structure 3 and the steel pipe 10 have a manufacturing error. Thus, as shown in FIGS. 2 and 3, the steel pipe 10 and the joint 20 are not welded at positions on the design (indicated by chain double-dashed lines) but are welded at a position where the manufacturing error is absorbed (indicated by solid lines). For this reason, the welding method includes a measurement step of measuring the manufacturing error, a calculation step of calculating the positions of the steel pipe 10 and the joint 20 where the manufacturing error is absorbed, and a welding step of welding the steel pipe 10 and the joint 20 at the calculated positions of the steel pipe 10 and the joint 20. The positions of the steel pipe 10 and the joint 20 on the design (hereinafter will be referred to as design positions, which are indicated by the chain double-dashed lines) and the position where the manufacturing error is absorbed (hereinafter will be referred to as adjusted positions, which are indicated by solid lines) will be discussed below. For convenience of explanation, as shown in FIGS. 2 and 3, the axial direction (e.g., a horizontal direction) of the steel pipe 10 at the design position will be denoted as a Z direction, whereas a direction perpendicular to the Z direction will be denoted as an XY direction (an X direction and a Y direction). As shown in FIG. 4, the X direction (e.g., another horizontal direction) and the Y direction (e.g., a vertical direction) are perpendicular to each other. As shown in FIG. 3, a displacement at the adjusted position from the design position can be divided into a maximum displacement p in the XY direction, a displacement dz in the Z direction, and an inclination $\alpha$. As shown in FIG. 4, the maximum displacement p in the XY direction is the square root of the sum of the square of the displacement dx in the X direction and the square of the displacement dy in the Y direction $\{p=\sqrt{(dx^2+dy^2)}\}$. As shown in FIG. 5, for the maximum displacement p in the XY direction, an insertion amount is adjusted to incline the joint 20 at a predetermined angle $\theta$ from the design position. As shown in FIGS. 6 and 7, for the inclination $\alpha$ and the displacement dz in the Z direction, the insertion amount of the steel pipe 10 into the joint 20 is adjusted. The manufacturing error is absorbed by these adjustments.

Figure 8:
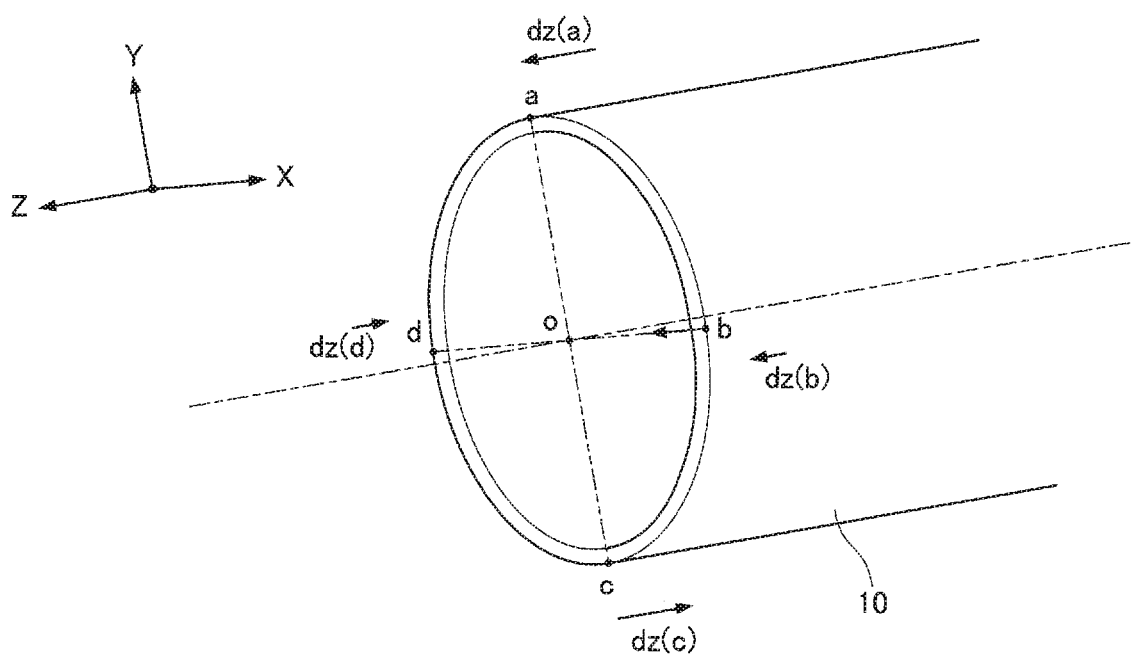
FIG. 8 is a schematic perspective view showing multiple points measured in a measurement step in a method for welding the steel pipe and the joint.

In the measurement step, the positions of multiple points on one end of the steel pipe 10 in the steel pipe structure 3 are measured by a 3D measuring instrument. The points are optionally selected. For example, the points preferably include points selected at equal intervals on the outer periphery of the steel pipe 10 for precision. As shown in FIG. 8, the selected points on, for example, on the outer periphery of one end of the steel pipe 10 are: a maximum point a in the Y direction, a maximum point b in the X direction, a minimum point c in the Y direction, a minimum point d in the X direction, and a point o at the intersection of the axis of the steel pipe 10 and planes including the points a to d. In this case, the 3D measuring instrument measures displacements dz(a), dz(b), dz(c), and dz(d) in the Z direction at the points a to d in FIG. 8 and displacements dx and dy in the XY direction at the point o in FIG. 4.

In the calculation step, the predetermined angle θ for inclining the joint 20 from the design position and the insertion amounts of the steel pipe 10 into the joint 20 at the points a to d are calculated, based on the displacements dz(a) to dz(d) in the Z direction at the points a to d and the displacements dx and dy in the XY direction at the point o that are measured in the measurement step.

Specifically, as shown in FIG. 5, the predetermined angle θ for inclining the joint 20 from the design position is calculated by an arc tangent based on a length L from the panel point R in the other steel pipe structure 2 to the design position of the point o and the maximum displacement p in the XY direction at the point o. In this case, the length L is clearly determined based on the design positions of the other steel pipe structure 2 and the connecting steel pipe 4, and the maximum displacement p in the XY direction at the point o is calculated from the displacements dx and dy in the XY direction at the point o. The insertion amounts of the steel pipe 10 into the joint 20 at the points a to d are temporarily calculated only based on the maximum displacement p in the XY direction at the point o, and then the insertion amounts are calculated by correction in consideration of the displacements dz(a) to dz(d) in the Z direction at the points a to d. In the temporary calculation, the temporary insertion amounts of the steel pipe 10 into the joint 20 at the points a to d are determined according to the predetermined angle θ and an angle ω formed by a displacement at the point o in FIG. 4 (the angle ω of the steel pipe 10 having a maximum in-plane displacement). In the correction, the displacements dz(a) to dz(d) in the Z direction at the points a to d are added to the temporary insertion amounts, thereby precisely determining the insertion amounts of the steel pipe 10 into the joint at the points a to d. In the calculation step, for example, spreadsheet software is used.

In the welding step, according to the predetermined angle θ and the precise insertion amounts that are calculated in the calculation step, the joint 20 is inclined from the design position, the steel pipe 10 in the steel pipe structure 3 is inserted into the joint 20, and then the steel pipe 10 and the joint 20 are welded after being combined. In this welding, a gap between the steel pipe 10 and the joint 20 is filled with weld beads if necessary.

Referring to the flowchart of FIG. 9, the method for welding the steel pipe 10 in the steel pipe structure 3 and the joint 20 will be described below.

In this welding method, as shown in FIG. 9, the 3D measuring instrument first measures the displacements dz(a) to dz(d) in the Z direction at the points a to d and the displacements dx and dy in the XY direction at the point o as the measurement step (see S1 in FIG. 9). Subsequently, as the calculation step, the predetermined angle θ for inclining the joint 20 from the design position is calculated based on the length L from the panel point R in the other steel pipe structure 2 to the design position of the point o and the measured displacements dx and dy in the XY direction at the point o (see S2 in FIG. 9). The temporary insertion amounts of the steel pipe 10 into the joint 20 at the points a to d are temporarily calculated according to the calculated predetermined angle θ and the angle ω formed by a displacement at the point o (see S3 in FIG. 9). The temporarily calculated insertion amounts of the steel pipe 10 into the joint 20 at the points a to d are corrected to precise insertion amounts based on the displacements dz(a) to dz(d) in the Z direction at the points a to d (see S4 in FIG. 9). Finally, as the welding step, the joint 20 is inclined from the design position according to the calculated predetermined angle θ, the steel pipe 10 is inserted into the joint 20 according to the calculated precise insertion amounts, and then the steel pipe 10 and the joint 20 are welded to each other (see S5 in FIG. 9).

Hence, according to the method for welding the steel pipe 10 in the steel pipe structure 3 and the joint 20, the positions of the steel pipe 10 and the joint 20 are calculated before welding so as to absorb the manufacturing error. Thus, the steel pipe 10 and the joint 20 welded at the calculated positions can have a proper positional relationship.

The positions calculated before welding are the predetermined angle θ for inclining the joint 20 from the design position and the insertion amount of the steel pipe 10 into the joint 20 inclined at the predetermined angle θ. Thus, the steel pipe 10 and the joint 20 can be easily adjusted to these positions so as to enable welding in a more proper positional relationship.

The predetermined angle θ is calculated based on the maximum displacement p in the XY direction at the point o, thereby more properly calculating the positions before welding. Thus, the steel pipe 10 and the joint 20 can be welded in a more proper positional relationship.

Additionally, the insertion amount of the steel pipe 10 into the joint 20 inclined at the predetermined angle θ is calculated based on the predetermined angle θ, the maximum displacement p, and the displacements in the Z direction at the multiple points on one end of the steel pipe 10, thereby more properly calculating the positions before welding. Thus, the steel pipe 10 and the joint 20 can be welded in a more proper positional relationship.

In the present embodiment, the steel pipe structures 2 and 3 include the multiple short steel pipes 10 that are radially welded. Any structure may be used as long as the structure has the steel pipe 10 to be welded to the joint 20.

In the present embodiment, the joint 20 is a slip-on flange. Any joint may be used as long as the steel pipe 10 in the steel pipe structure 2 or 3 is inserted and welded from one side of the joint 20 while being inclined so as to absorb the manufacturing error, and the steel pipe 10 on one side can be joined to a steel structure on the other side.

Furthermore, in the present embodiment, the length L ranges from the panel point R in the other steel pipe structure to the design position of the point o. The length L may range from another point in the Z direction passing through the panel point R to the design position of the point o.

The invention claimed is:

1. A method for welding a steel pipe in a steel pipe structure and a joint, the joint being configured to join the steel pipe with another steel pipe, the method comprising:
a measurement step of measuring a manufacturing error of the steel pipe in the steel pipe structure;
a calculation step of calculating positions of the steel pipe and the joint where the manufacturing error measured in the measurement step is absorbed; and
a welding step of welding, the steel pipe and the joint at the positions of the steel pipe and the joint with the joint being inclined from a design position and the steel pipe being inserted into the joint, the positions being calculated in the calculation step;
wherein a displacement at the calculated positions of the steel pipe and the joint where the manufacturing error measured in the measurement step is absorbed from the design position is divided into a first displacement component in a plane perpendicular to an axis of the steel pipe at the design position, a second displacement component in a direction parallel to the axis of the steel pipe at the design position, and an inclination;
wherein the first displacement component in the plane perpendicular to the axis of the steel pipe at the design position is a function of a displacement in a first direction of the plane perpendicular to the axis of the steel pipe at the design position and a displacement in a second direction of the plane perpendicular to the axis of the steel pipe at the design position, the first direction and the second direction being perpendicular to each other;
wherein an insertion amount is adjusted to incline the joint at a predetermined angle from the design position for the first displacement component in the direction perpendicular to the axis of the steel pipe at the design position, and the insertion amount of the steel pipe into the joint is adjusted for the inclination and the displacement in the direction parallel to the axis of the steel pipe at the design position, so that the manufacturing error is absorbed; and
wherein the calculated positions of the steel pipe and the joint are the predetermined angle for inclining the joint from the design position, and the insertion amount of the steel pipe into the joint inclined at the predetermined angle.

2. The method for welding a steel pipe in a steel pipe structure and a joint according to claim 1, wherein the predetermined angle is calculated based on a length between a point of the design position on the steel pipe structure and a point on another steel pipe structure to be connected to the steel pipe structure, and a manufacturing error in the direction perpendicular to the axis of the steel pipe at the design position.

3. The method for welding a steel pipe in a steel pipe structure and a joint according to claim 1, wherein the insertion amount of the steel pipe into the joint is calculated based on the predetermined angle, a manufacturing error in the direction perpendicular to the axis of the steel pipe at the design position, and a manufacturing error in the direction parallel to the axis of the steel pipe at the design position.

4. The method of welding a steel pipe in a steel pipe structure and a joint according to claim 1, wherein the first displacement component is a maximum displacement in the plane perpendicular to the axis of the steel pipe.

5. The method of welding a steel pipe in a steel pipe structure and a joint according to claim 4, wherein the first displacement component in the plane perpendicular to the axis of the steel pipe at the design position is a square root of a sum of a square of the displacement in the first direction of the plane perpendicular to the axis of the steel pipe at the design position and a square of the displacement in the second direction of the plane perpendicular to the axis of the steel pipe at the design position.

\* \* \* \* \*